(12) United States Patent
Itou et al.

(10) Patent No.: US 9,014,980 B2
(45) Date of Patent: Apr. 21, 2015

(54) VEHICULAR NAVIGATION APPARATUS

(71) Applicant: Denso Corporation, Kariya, Aichi-pref. (JP)

(72) Inventors: Masakazu Itou, Kariya (JP); Toshihide Andoh, Chita-gun (JP); Hiroshi Ishiguro, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/356,319

(22) PCT Filed: Nov. 2, 2012

(86) PCT No.: PCT/JP2012/007048
§ 371 (c)(1),
(2) Date: May 5, 2014

(87) PCT Pub. No.: WO2013/069241
PCT Pub. Date: May 16, 2013

(65) Prior Publication Data
US 2014/0316703 A1   Oct. 23, 2014

(30) Foreign Application Priority Data
Nov. 7, 2011   (JP) .................................. 2011-243841

(51) Int. Cl.
*G01C 21/00*  (2006.01)
*G01C 21/36*  (2006.01)

(52) U.S. Cl.
CPC .................................. *G01C 21/3626* (2013.01)

(58) Field of Classification Search
CPC ..... G01C 21/3626; G01C 21/26; G06F 3/048
USPC ......................................................... 701/538
See application file for complete search history.

(56) References Cited

U.S. PATENT DOCUMENTS 3,680,355 A * 8/1972 Goldstein et al. .............. 73/1.77
4,914,598 A * 4/1990 Krogmann et al. ............. 701/11
(Continued)

FOREIGN PATENT DOCUMENTS

JP   2005-099403 A   4/2005
JP   2007-145137 A   6/2007
(Continued)

OTHER PUBLICATIONS

International Search Resort and Written Opinion of the ISA, ISA/JP, mailed Jan. 29, 2013.

*Primary Examiner* — Mary Cheung
*Assistant Examiner* — Frederick Brushaber
(74) *Attorney, Agent, or Firm* — Harness, Dickey & Pierce, PLC

(57) ABSTRACT

A vehicular navigation apparatus configured to independently operate a dedicated application and an externally-introduced general-purpose application is provided. The navigation apparatus includes a control device and a management device. The management device notifies the control device of attribute information of the general-purpose application in operation. Based on the attribute information, the control device determines whether the general-purpose application operating under a specified condition is allowed to use user interface output under the specified condition. When no user interface output is allowed as a result of the determination, the control device switches over the user interface output to user interface output using another certified general-purpose application.

7 Claims, 8 Drawing Sheets

(56) References Cited

U.S. PATENT DOCUMENTS

| | | | |
|---|---|---|---|
| 5,184,304 A * | 2/1993 | Huddle | 701/510 |
| 6,209,383 B1 * | 4/2001 | Mueller et al. | 73/1.37 |
| 6,256,578 B1 * | 7/2001 | Ito | 701/400 |
| 6,490,520 B2 * | 12/2002 | Narumi et al. | 701/400 |
| 7,415,323 B2 * | 8/2008 | Miyamoto et al. | 701/1 |
| 7,529,703 B2 * | 5/2009 | Benzschawel et al. | 705/36 R |
| 8,165,795 B2 * | 4/2012 | Debailleul | 701/510 |
| 8,290,744 B2 * | 10/2012 | Brady et al. | 702/183 |
| 2005/0267676 A1 * | 12/2005 | Nezu et al. | 701/200 |
| 2007/0061068 A1 * | 3/2007 | Okamoto et al. | 701/208 |
| 2007/0126698 A1 * | 6/2007 | Iwamoto et al. | 345/156 |
| 2011/0285525 A1 * | 11/2011 | Ishibashi | 340/461 |
| 2013/0166146 A1 * | 6/2013 | Tanaka | 701/36 |

FOREIGN PATENT DOCUMENTS

| | | |
|---|---|---|
| JP | 2008-281361 A | 11/2008 |
| JP | 2010-014653 A | 1/2010 |
| JP | 2010-157252 A | 7/2010 |

* cited by examiner

VEHICULAR NAVIGATION APPARATUS

CROSS-REFERENCE TO RELATED APPLICATIONS

The present application is a 371 U.S. National Phase of PCT/JP2012/007048, filed on Nov. 2, 2012, which is based on Japanese patent applicaton No. 2011-243841 filed on Nov. 7, 2011, the contents of which are incorporated herein by reference.

TECHNICAL FIELD

The present disclosure relates to a vehicular navigation apparatus that operates an externally-introduced HMI (Human machine interface) application on a specified platform.

BACKGROUND ART

Conventionally, a vehicular navigation apparatus is developed to introduce a specified HMI application from outside using a dedicated wireless device (e.g., DCM: Data Communication Module) or a mobile telephone terminal. Using the HMI application, the vehicular navigation apparatus provides information through user interface (UI) output such as display or audio output by the HMI application (see patent document 1).

The inventors of the present application found the following concerning the vehicular navigation apparatus. In order to incorporate the HMI application from outside and operate it, the conventional vehicular navigation apparatus needs to individually develop an application suited for operational requirements of this vehicular navigation apparatus. For example, HMI applications are developed to conform to open platforms for handheld terminals such as smartphones. However, the developed HMI applications cannot be directly introduced into the vehicular navigation apparatus for operation.

The vehicular navigation apparatus operates ready-made vehicular applications that are originally installed to provide route guidance, car audiovisual information, and obstacle avoidance guidance using a clearance sonar. Accordingly, the following problem may arise if the vehicular navigation apparatus can introduce an HMI application other than applications exclusively developed for the vehicular navigation apparatus.

For example, an HMI application acquired from outside may display a UI output image in cases where a ready-made vehicular application should display a UI output screen. As a result, the original ready-made application may not display the UI output screen.

To avoid this situation, adjustment is needed so that audiovisual UI output from the ready-made application does not compete with UI output from the HMI application introduced from outside. In regard to this point, in the conventional vehicular navigation apparatus, an externally-introduced HMI application should be provided with individual set-up in consideration of operational requirements for the vehicular navigation apparatus into which the HMI application is to be externally introduced. Therefore, considerable development resources are needed to individually develop HMI applications suited for the vehicular navigation apparatus requirements. This may hamper widespread use of HMI applications that are excellent in information freshness or general versatility.

PRIOR ART LITERATURE

Patent Literature

Patent Literature 1: JP-A-2010-14653

SUMMARY OF THE INVENTION

The present disclosure has been made in consideration of the foregoing. It is an object of the disclosure to provide a vehicular navigation apparatus that is capable of UI output using an externally-introduced HMI application other than applications dedicatedly developed for the vehicular navigation apparatus, and that is capable of selecting necessary UI output according to specified conditions.

According to an example of the present disclosure, a vehicular navigation apparatus having a platform for operating a general-purpose application externally introduced via information communication is provided. The vehicular navigation apparatus is configured to operate a dedicated application independent of the platform and the general-purpose application on the platform independently of each other. The vehicular navigation apparatus comprises a control device and a management device. The control device switches over user interface (UI) output on a specified output device selectively from UI output of the dedicated application and UI output of the general-purpose application that is operating on the platform. The management device is provided as an application (software) operating on the platform. The management device acquires attribute information of the general-purpose application introduced in the vehicular navigation apparatus, and notifies the control device of the attribute information of the general-purpose application operating on the platform. Under a specified condition, the control device determines based on the attribute information notified from the management device whether the general-purpose application operating on the platform and using the output device for the UI output is allowed to use the UI output under the specified condition. When the control device determines that the general-purpose application operating on the platform and using the output device for the UI output is not allowed to use the UI output under the specified condition, the control device switches over the UI output on the output device to UI output of the dedicated application or UI output of another general-purpose application that is operating on the platform and that is allowed to use the UI output under the specified condition.

According to the above configuration, the vehicular navigation apparatus can perform the UI output using an externally-introduced HMI application other than dedicated application developed dedicatedly for the vehicular navigation apparatus and can select necessary UI output according to specified conditions.

BRIEF DESCRIPTION OF THE DRAWINGS

The foregoing and other advantages and features of the invention will become more apparent from the detailed description of the preferred embodiment of the disclosure given below with reference to the accompanying drawings in which.

MODES FOR CARRYING OUT THE INVENTION

An embodiment of the present disclosure will be described with reference to the accompanying drawings.

(Configuration of a Vehicular Navigation Apparatus 1)

Figure 1A:
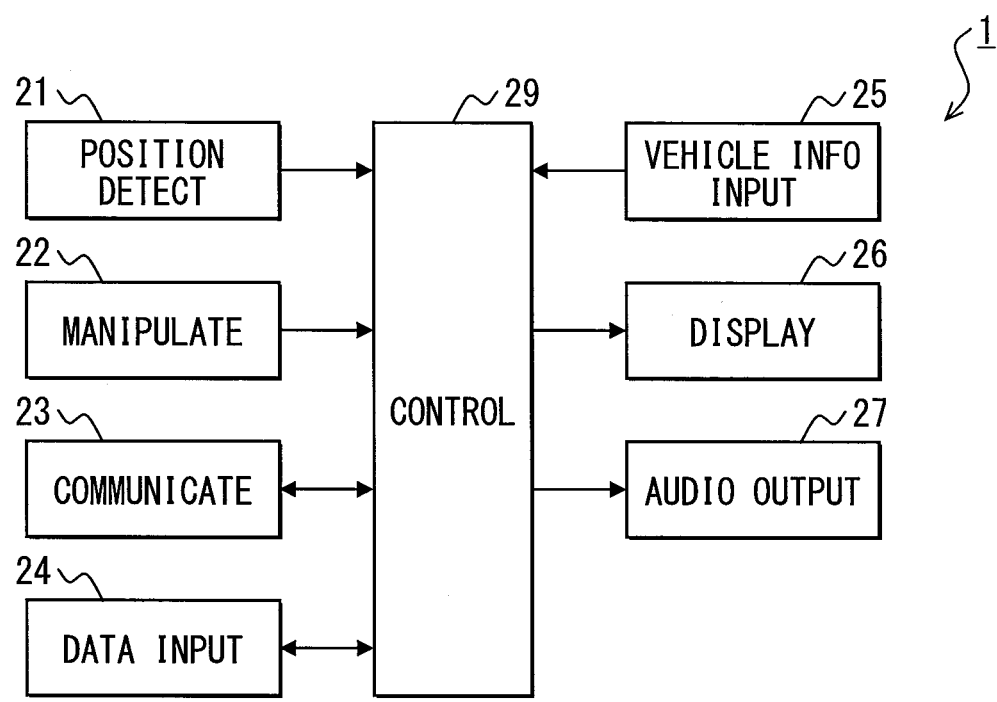
FIG. 1A is a block diagram illustrating a schematic configuration of a vehicular navigation apparatus.

The vehicular navigation apparatus 1 according to the embodiment is mounted on a vehicle. As illustrated in FIG. 1A, the vehicular navigation apparatus 1 includes a position detection device 21, a manipulation device 22, a communication device 23, a data input device 24, a vehicle information input device 25, a display device 26, an audio output device 27, and a control device 29. The position detection device 21 detects the vehicle's current location. The manipulation device 22 is supplied with various instructions from a user. The communication device 23 includes a communication device for wireless communication with the outside. The data input device 24 is supplied with data from a mass storage medium that stores map data and programs. The vehicle information input device 25 is supplied with vehicle information output from various in-vehicle units. The display device 26 displays information outputted from various applications. The audio output device 27 audibly outputs information outputted from various applications.

The position detection device 21 detects a signal transmitted from an artificial satellite for GPS (Global Positioning System). The position detection device 21 calculates the vehicle's current location, orientation, and speed based on signals output from a GPS receiver, a gyroscope, and a distance sensor. The GPS receiver detects the vehicle's position coordinates and altitude. The gyroscope outputs a detection signal corresponding to an angular velocity of rotary motion applied to the vehicle. The distance sensor outputs the vehicle's mileage.

The manipulation device 22 includes a touch panel integrally provided on a display surface of the display device 26 and mechanical key switches provided around the display device 26. The communication device 23 uses wireless communication to provide cloud computing on the Internet and data communication with portable communication terminals such as smartphones. The communication device 23 thereby acquires various open contents and general-purpose applications.

The data input device 24 supplies the control device 29 with various data such as map data, system programs, application programs, and content data stored in a hard disk, for example. The vehicle information input device 25 acquires information about vehicle operating state from ECUs (Electronic Control Unit) that control the vehicle.

The display device 26 functions as a color display apparatus having a display surface such as a liquid crystal display. The display device 26 provides an output apparatus to display images as UI output from dedicated or general-purpose applications operating in the control device 29. The audio output device 27 provides an output apparatus to generate the sound as UI output from dedicated or general-purpose applications operating in the control device 29.

The control device 29 mainly includes a known information-processing device (e.g., a microcomputer) including a CPU, ROM, RAM, I/O devices and a bus line connecting these components and controls the above-mentioned constituent devices. The control device 29 performs various application processes based on programs or data read from the ROM or the data input device 24.

Figure 1B:
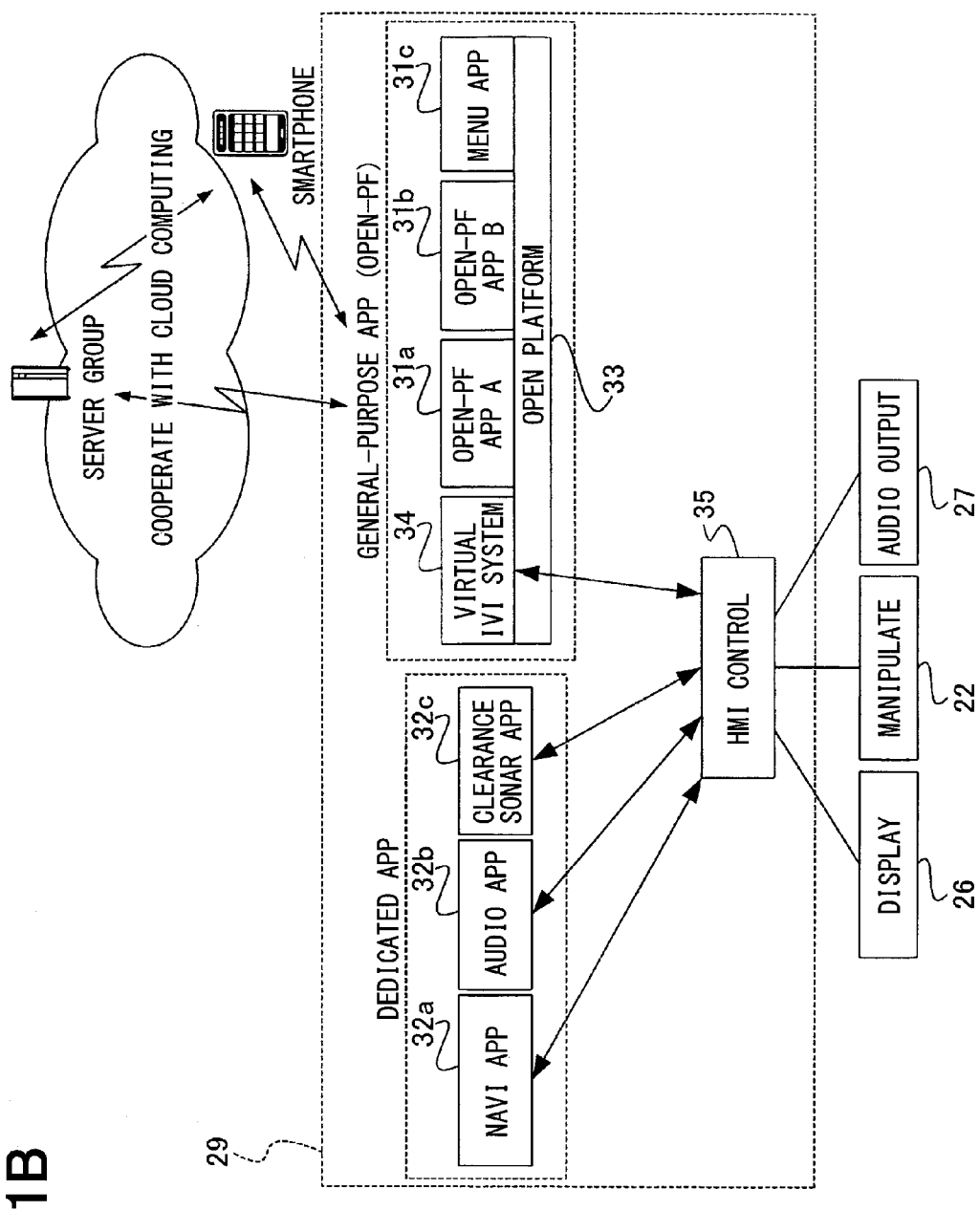
FIG. 1B is a block diagram illustrating a configuration of a software system for the vehicular navigation apparatus.

With reference to FIG. 1B, the following describes a software system provided by the control device 29. The control device 29 configures the software system including a dedicated application, an open platform 32, a general-purpose application, a virtual IVI system 34, and an HMI controller 35.

The dedicated application is built in the vehicular navigation apparatus and is exemplified as a navigation application 31a, an audio application 31b, and a clearance sonar application 31c. The display device 26 and the audio output device 27 are used for audiovisual UI output from the dedicated applications. The manipulation device 22 interacts with user manipulation on the dedicated applications.

The navigation application 31a provides route guidance for vehicles and performs map display, route search, and route guidance. The map display is a function that calculates the vehicle's current location based on a detection signal from the position detection device 21 and allows the display device 26 to display UI output such as a mark on the map indicating the current location or the vehicle's current location supplied to the data input device 24. The route search is a function that automatically calculates an optimal route from the current location to a destination based on map data supplied to the data input device 24 and the destination supplied by a user from the manipulation device 22. The route guidance is a function that provides travel guidance along a route found from the route search. The route guidance determines a point for the travel guidance (i.e., navigation for turning instructions) and the contents of the travel guidance using route search results and road connection information or intersection location information stored as map data. Based on the determination, the route guidance draws the map for the current location and recommended routes or an enlarged view near intersections and allows the display device 26 to display them as UI output. The travel guidance also uses audible guidance as UI output from the audio output device 27.

The audio application 31b outputs various types of video and audio based on various audiovisual sources such as a television tuner, a CD drive, a DVD drive, digital audio player, and a radio tuner, for example. As an audio-related function, the display device 26 and the audio output device 27 provide UI output using video and audio based on audiovisual signals from user-specified audiovisual sources included in selectable audiovisual sources.

The clearance sonar application 31c audiovisually notifies a driver of an approaching obstacle detected by a sonar provided for the vehicle body. The clearance sonar application 31c uses the sonar provided at the front or the rear of the vehicle body to detect an obstacle that may get contact with the vehicle. In this case, the clearance sonar application 31c allows the display device 26 to display UI output such as the direction or the distance of the obstacle from the vehicle. The clearance sonar application 31c allows the audio output device 27 to generate UI output such as an alarm sound or voice that warns of the approaching obstacle.

The open platform 32 is an operating system (OS) that provides applications with interfaces as abstraction of hardware in the computer system. The open platform 32 provides a standardized OS. The open platform 32 enables various general-purpose applications compliant with the standard to operate. The vehicular navigation apparatus 1 enables UI output from a general-purpose application compliant with the standard of the open platform 32 even if the general-purpose application is not dedicated to vehicles and is developed by a third party not having a direct relationship with the vendor of the vehicular navigation apparatus itself.

The general-purpose applications operate on the open platform 32 dependently on the open platform 32. The general-purpose applications include an open PF application 33a (application A), an open PF application 33b (application B), and a menu application 33c, for example. The display device 26 and the audio output device 27 are used for audiovisual UI output from the general-purpose applications. The manipulation device 22 interacts with user manipulation on the dedicated applications.

For example, the general-purpose application represents an external application introduced by the user as needed. The general-purpose application is introduced using data communication from servers for cloud computing on the Internet. By these general-purpose applications, information and user interfaces can be shared in a wide range of areas in cooperation with cloud computing and intelligent mobile terminals such as smartphones. The general-purpose applications allow the display device 26 and the audio output device 27 to generate UI output including diverse information as well as information about vehicle traveling.

The virtual IVI (In-Vehicle Infotainment) system 34 provides an application that manages and controls other general-purpose applications operating on the open platform 32. The virtual IVI system 34 itself is configured as an application operating on the open platform 32.

The virtual IVI system 34 acquires attribute information of general-purpose applications introduced in the vehicular navigation apparatus 1 and stores the attribute information in a specified storage. The attribute information of general-purpose applications specifies whether it is possible to generate UI output from a given general-purpose application under a specified condition or whether it is possible to suspend operation of the general-purpose application. To acquire the attribute information of general-purpose applications, for example, the virtual IVI system 34 confirms that the application supplier duly certifies the attribute information. Based on the confirmation result, the virtual IVI system 34 specifies whether it is possible to generate UI output under a specified condition or suspend operation.

The virtual IVI system 34 checks a general-purpose application operating on the open platform 32. The virtual IVI system 34 reads attribute information of the operating general-purpose application from the previously stored attribute information and notifies the read attribute information to the HMI controller 35. When notified of a stop event from the HMI controller 35, the virtual IVI system 34 provides control to suspend or forcibly end operation of general-purpose applications operating on the open platform 32 according to the attribute information of the general-purpose applications.

The HMI controller 35 is provided as the software to control selection of UI output from a dedicated application independent of the open platform 32 and a general-purpose application dependent on the open platform 32 while the dedicated application and the general-purpose application operate independently of each other. The HMI controller 35 switches over the UI output such as image display or audio output according to specified conditions, selectively from the UI outputs of the applications that share the output device such as the display device 26 and the audio output device 27. The HMI controller 35 thereby mediates user interface output between the applications.

Specifically, if a specified condition is met, the HMI controller 35 determines whether the dedicated application or the general-purpose application is appropriate for audiovisual UI output to the display device 26 or the audio output device 27 under this specified condition. For example, the specified condition signifies that the vehicle starts traveling or the dedicated application requests a specified high-priority UI output event.

Based on the attribute information notified from the virtual IVI system 34, the HMI controller 35 determines whether general-purpose applications operating on the open platform 32 is appropriate for UI output. The HMI controller 35 exchanges the attribute information with the virtual IVI system 34 and therefore need not be aware of which general-purpose application is operating on the open platform 32.

The HMI controller 35 switches over the UI output application for the display device 26 or the audio output device 27 according to the result of determining the applicability of the UI output under the specified condition. The HMI controller 35 notifies a stop event to the virtual IVI system 34 if a general-purpose application operating on the open platform 32 needs to be suspended depending on a condition. Also in this case, the HMI controller 35 exchanges the notification of a stop event with the virtual IVI system 34 and therefore need not be aware of which general-purpose application is operating on the open platform 32.

The function available in cooperation with the virtual IVI system 34 and the HMI controller 35 realizes the followings: while the standard set-up of the open platform 32 or the general-purpose application is being maintained without the need to install the set-up unique to the vehicular navigation apparatus in the open platform 32 or the general-purpose application itself, each general-purpose application can execute operations to satisfy requirements to exhibit its function on the vehicular navigation apparatus.

(Process Performed by the HMI Controller)

Figure 2:
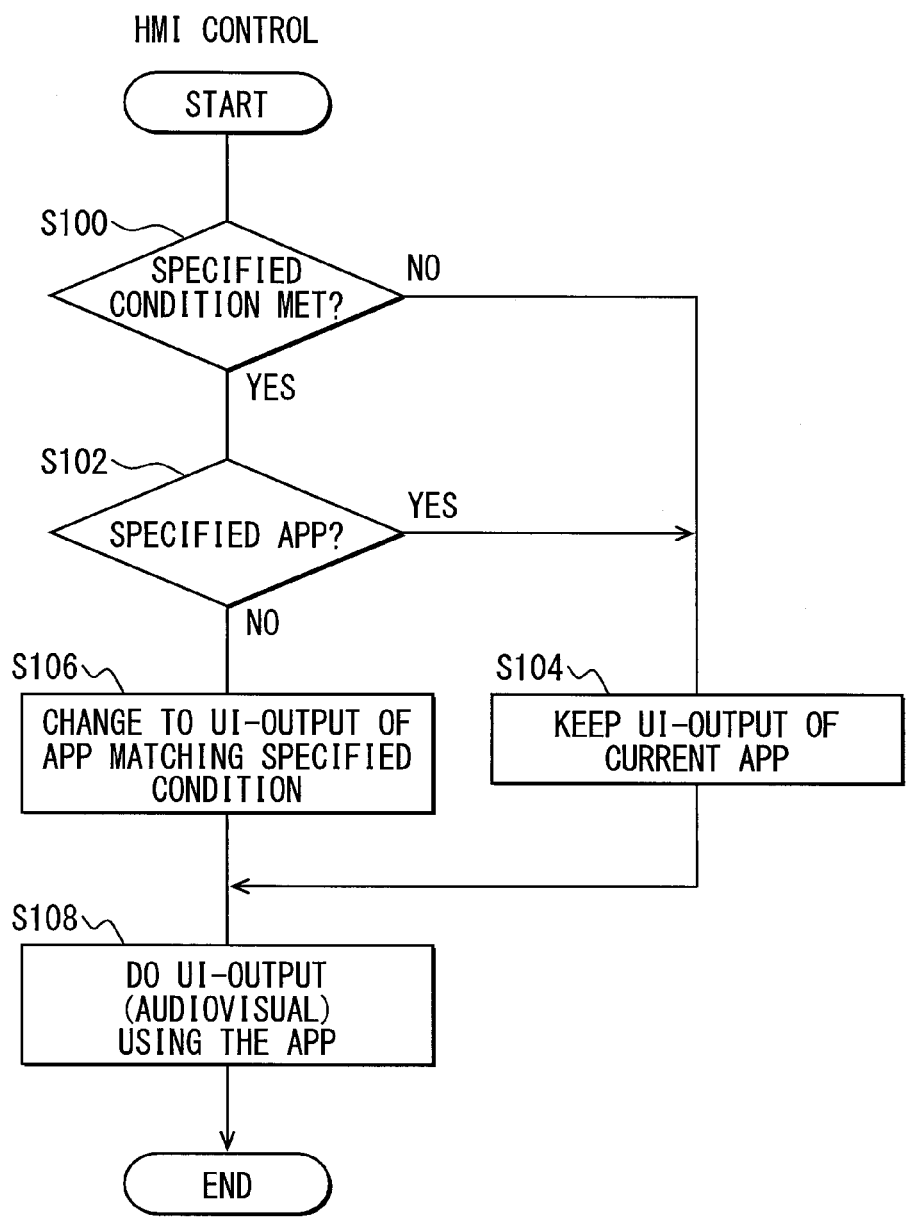
FIG. 2 is a flowchart illustrating a procedure of a UI output control process.

With reference to the flowchart in FIG. 2, the following describes a procedure of a UI output control process performed by the HMI controller 35. The process is performed in parallel to a dedicated application or a general-purpose application performed in the vehicular navigation apparatus 1.

The HMI controller 35 determines whether the current situation satisfies a specified condition to switch over an application for UI output (S100). Specifically, the HMI controller 35 determines a specified condition indicating whether the vehicle starts traveling or the active dedicated application requests a specified high-priority UI output event. The process proceeds to S102 if the current situation satisfies the specified condition (YES at S100). The process proceeds to S104 if the current situation does not satisfy the specified condition (NO at S100). At S104, the HMI controller 35 maintains UI output from the current application.

At S102, the HMI controller 35 determines whether an application currently performing audiovisual UI output to the output device such as the display device 26 or the audio output device 27 corresponds to a specific application that is allowed at S100 to perform the UI output under the specified condition.

Specifically, when a general-purpose application operating on the open platform 32 is performing the UI output, the HMI controller 35 references the attribute information notified from the virtual IVI system 34. Based on the contents of the attribute information, the HMI controller 35 determines whether the general-purpose application is the specific application that matches the UI output under the current specified condition. If the dedicated application is in process of the UI output, the HMI controller 35 determines based on setup information of the dedicated application whether the general-purpose application is a specific application that matches the UI output under the current specified condition. The HMI controller 35 may unconditionally treat a dedicated application as the specific application.

The process proceeds to S104 if the application performing the UI output corresponds to the specific application satisfying the current specified condition (YES at S102). At S104, the HMI controller 35 maintains the UI output from the current application. The process proceeds to S106 if the application performing the UI output is a specific application that does not match the current specified condition (NO at S102). At S106, the HMI controller 35 selects another specific application satisfying the specified condition and switches over the UI output using the current application to the UI output using the selected specific application. From the currently operating dedicated applications or the currently operating general-purpose applications, the HMI controller 35 selects the general-purpose application satisfying the specified condition for the UI output. At S108, the HMI controller 35 perform the audiovisual UI output by using the application selected at S104 or S106.

(Process Performed by the Virtual IVI System)

Figure 3:
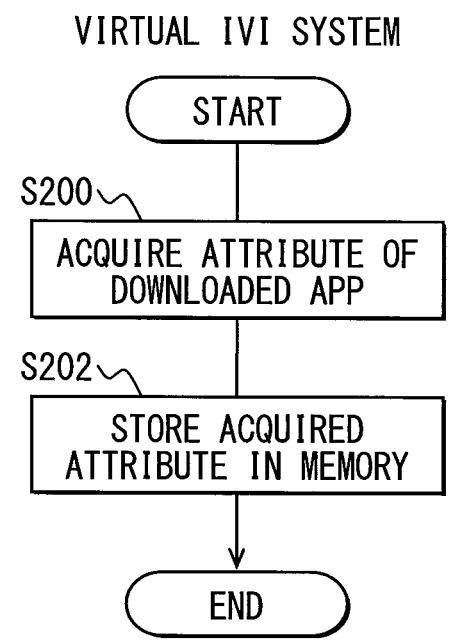
FIG. 3 is a flowchart illustrating a procedure of an attribute information acquisition process.

With reference to the flowchart in FIG. 3, the following describes a procedure of an attribute information acquisition process performed by the virtual IVI system 34. The process is performed when the vehicular navigation apparatus 1 downloads a general-purpose application from a server, which configures the cloud computing.

The virtual IVI system 34 acquires attribute information of the general-purpose application downloaded from a distribution source (S200). In this case, the virtual IVI system 34 performs an authentication process on the acquired general-purpose application and determines whether a supplier certifies that the general-purpose application is capable of specified operations such as UI output and capable of operation suspension under specified conditions. For example, the authentication process may access authentication information supplied from the distribution source or supplier of the general-purpose application via the Internet or may use authentication information contained in data of the downloaded application. Based on an authentication result from the authentication process, the virtual IVI system 34 acquires attribute information by specifying whether UI output is available under the specified condition or whether the operation suspension is available.

The virtual IVI system 34 stores the attribute information acquired at S200 in specified memory in association with the general-purpose application (S202). For example, the attribute information is recorded in a hard disk or nonvolatile semiconductor memory connected to the vehicular navigation apparatus 1. Alternatively, a storage device (storage means) to record the attribute information may be provided in an external server configuring the cloud computing. The storage device (storage means) in the external server may record the attribute information acquired by the virtual IVI system 34. The process ends after recording the attribute process.

(Display Switchover Sequence in a Traveling Restriction Event)

Figure 4A:
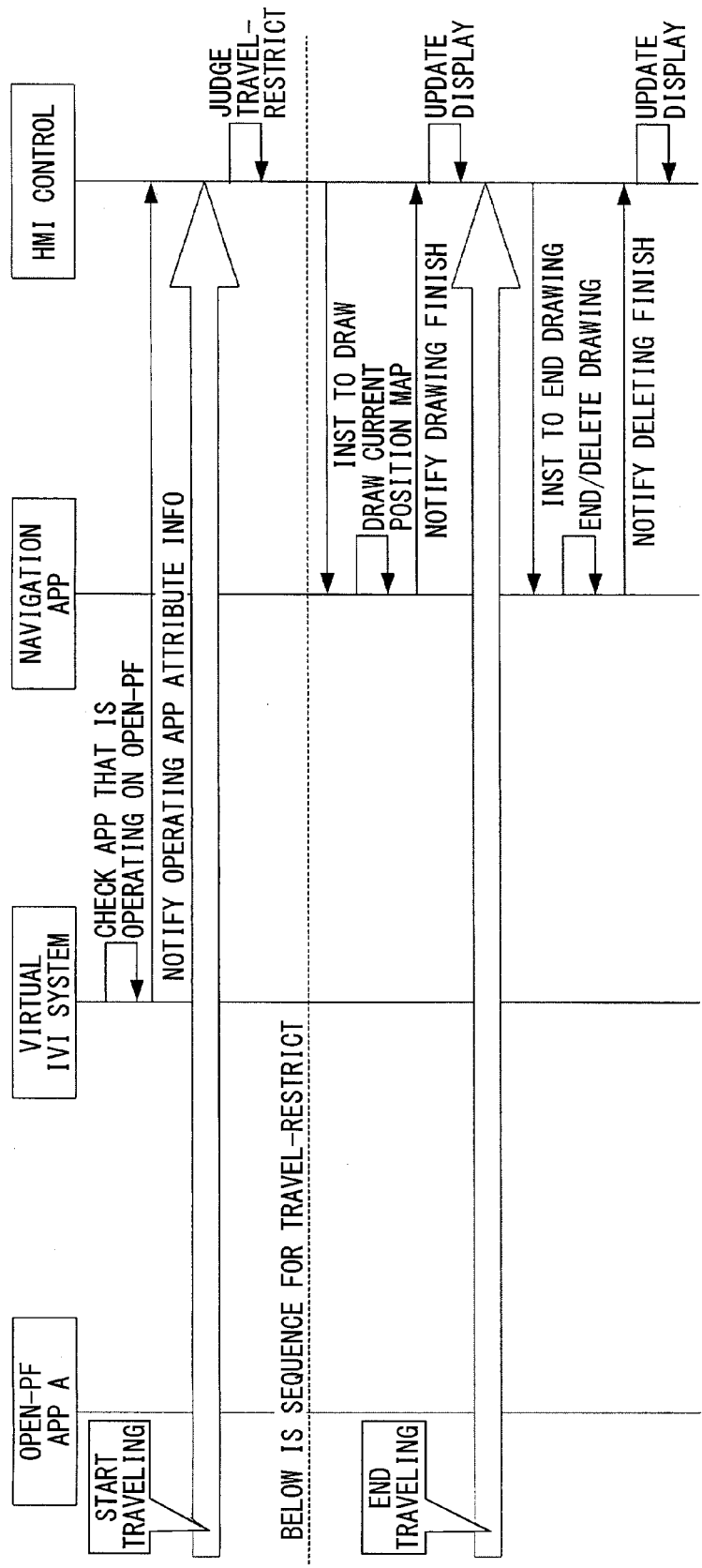
FIG. 4A is a sequence diagram illustrating a display switchover procedure in a traveling restriction event.
Figure 4B:
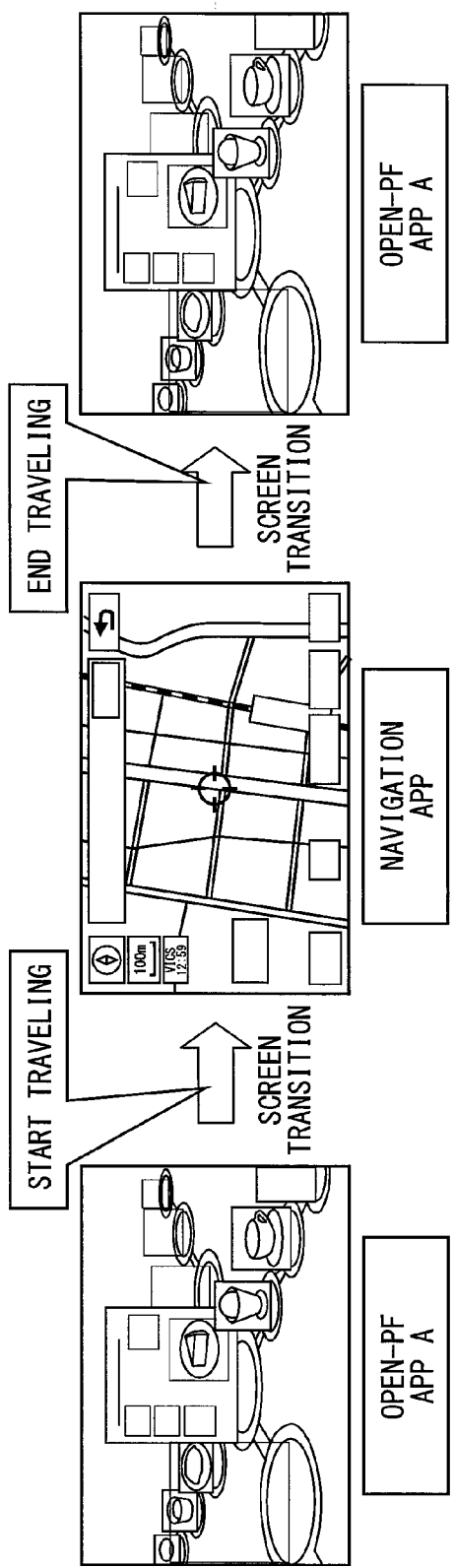
FIG. 4B illustrates screen transition in display switchover in a traveling restriction event.

With reference to FIGS. 4A and 4B, the following describes a display switchover sequence in a traveling restriction event as an example of the above-mentioned UI output control process. In the traveling restriction event, when the vehicle starts traveling, the content display using the general-purpose application designated as a traveling restriction target is switched over to the content display using the dedicated application. Thereafter, when the vehicle stops traveling, the original content display using the general-purpose application restarts.

According to the example illustrated in FIGS. 4A and 4B, the navigation application 31a (dedicated application) operates in parallel with open PF application A (general-purpose application) operating on the open platform 32. The example assumes that the display device 26 displays a content image as UI output from open PF application A at the time point before the vehicle starts traveling.

As illustrated in FIGS. 4A and 4B, the virtual IVI system 34 checks the general-purpose application currently operating on the open platform 32. The virtual IVI system 34 reads attribute information corresponding to the checked general-purpose open PF application A confirmed to be in operation. The virtual IVI system 34 notifies the attribute information to the HMI controller 35. The attribute information contains information specifying whether the UI output during traveling is allowed. When the attribute information specifies the prohibition of the UI output during traveling, the general-purpose application is designated as the traveling restriction target.

Based on the information supplied from the vehicle information input device 25, the HMI controller 35 detects that the vehicle starts traveling. The HMI controller 35 then references the attribute information notified from the virtual IVI system 34 and determines whether the general-purpose application currently operating on the open platform 32 is targeted for the traveling restriction. The HMI controller 35 performs the subsequent process if determining that the currently operating general-purpose application is targeted for the traveling restriction. The HMI controller 35 omits the subsequent process if determining that the, currently operating general-purpose application is not targeted for the traveling restriction.

When the HMI controller 35 confirm that the general-purpose application currently operating on the open platform 32 is targeted for the traveling restriction, the HMI controller 35 issues a drawing instruction to draw a content image to the navigation application 31a, which is a dedicated application.

When receiving the drawing instruction from the HMI controller 35, the navigation application 31a draws a map image near the current vehicle location in a specified image buffer to display the content image on the display device 26. When completing the map image drawing, the navigation application 31a notifies the completion to the HMI controller 35. When the HMI controller 35 is notified of the drawing completion from the navigation application 31a, the HMI controller 35 updates the display image on the display device 26 from the content image supplied by the open PF application A to the map image drawn by the navigation application 31a. According to the above-mentioned procedure, when the vehicle starts traveling, the screen of the display device 26 automatically transitions to the map image drawn by the navigation application 31a.

When the vehicle ceases traveling and becomes a stop state, the HMI controller 35 issues a drawing end instruction to the navigation application 31a. The navigation application 31a receives the drawing end instruction from the HMI controller 35, ends the map image drawing, and erases the image. When the map image erasure is complete, the navigation application 31a notifies this state to the HMI controller 35.

When notified of the erasure completion from the navigation application 31a, the HMI controller 35 updates the displayed image on the display device 26 from the map image drawn by the navigation application 31a to the content image supplied by open PF application A. According to the above-mentioned procedure, when the vehicle ceases traveling, the screen of the display device 26 automatically transitions to the content image supplied by the open PF application A.

There has been described the example where the above-mentioned traveling restriction event switches over display on the display device 26. The traveling restriction event also switches over applications for audio output according to the start or stop of vehicle traveling when the applications perform audio UI output (audio output device 27). In the traveling restriction event, the UI output destination after the start of vehicle traveling may be a currently-operating dedicated application other than the navigation application 31a or may be other general-purpose applications that are not targeted for the traveling restriction.

(Display Switchover Sequence in an Interrupt Event)

Figure 5A:
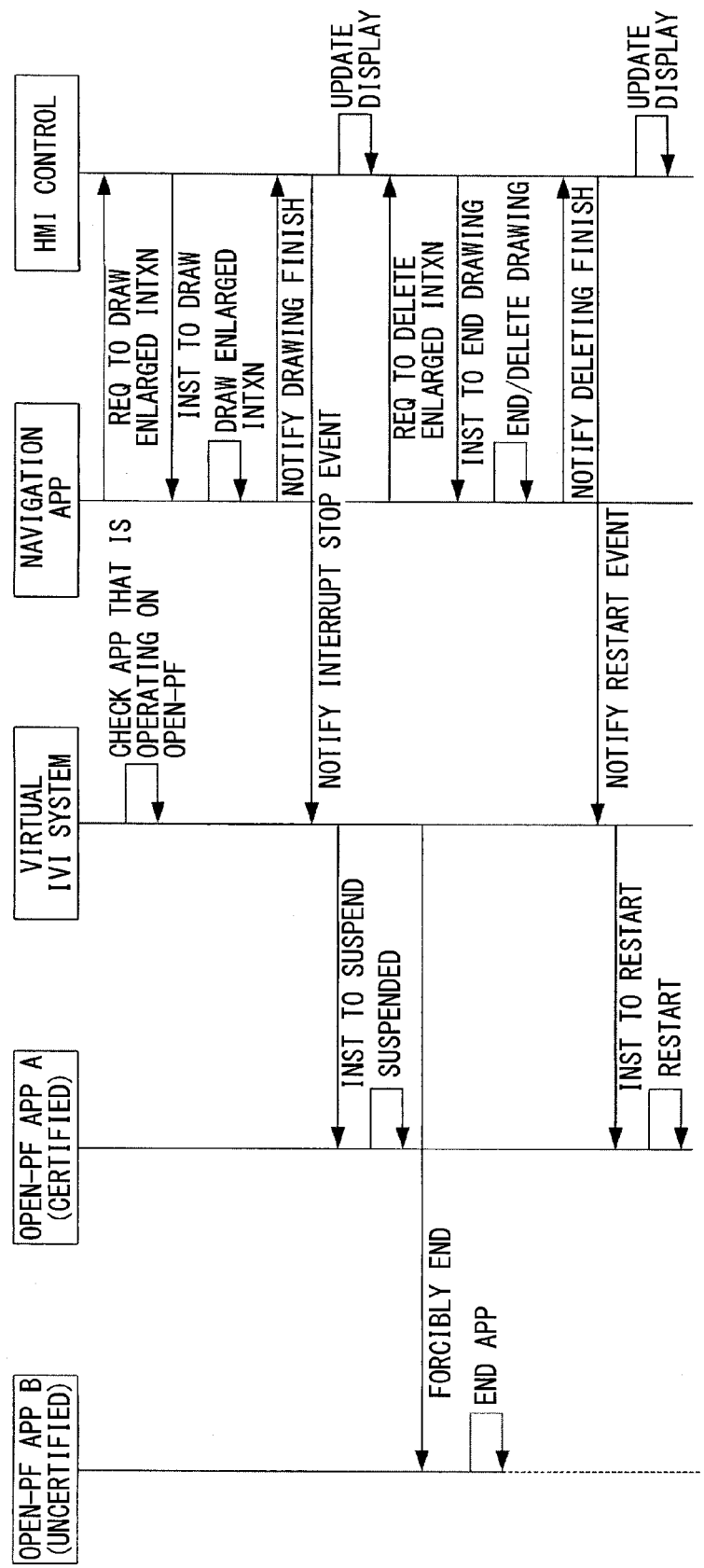
FIG. 5A is a sequence diagram illustrating a display switchover procedure in an interrupt event.
Figure 5B:
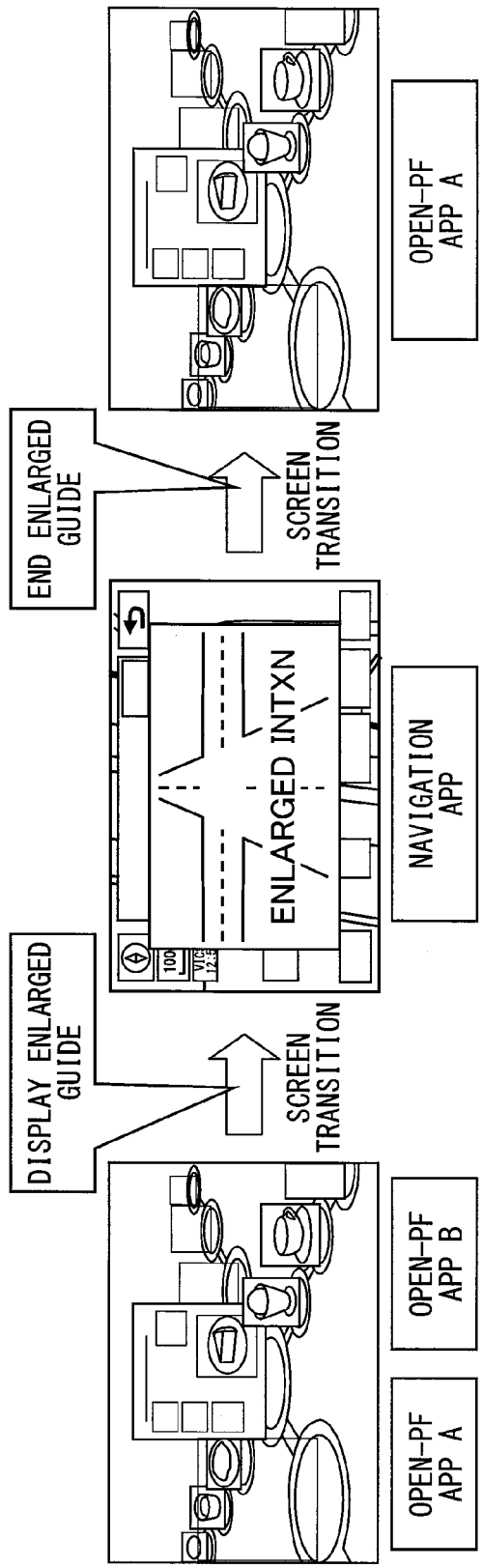
FIG. 5B illustrates screen transition in display switchover in an interrupt event.

With reference to FIGS. 5A and 5B, the following describes a display switchover sequence in an interrupt event as an example of the above-mentioned UI output control process. The dedicated application may generate an interrupt process for high-priority display. In such a case, the interrupt event suspends or forcibly ends a currently-operating general-purpose application and switches over the display to the contents of the dedicated application. When the interrupt process ends thereafter, the display switchover sequence releases the suspended general-purpose application and restarts displaying the content supplied by the general-purpose application.

The example illustrated in FIGS. 5A and 5B assumes parallel operation of the navigation application 31a (dedicated application), the open PF application A (general-purpose application, certified), and the open PF application B (general-purpose application, uncertified) both operating on the open platform 32. The example also assumes that the display device 26 displays content images as UI output from open PF applications A and B that are operating on the open platform 32 at the time point before the interrupt event occurs.

As illustrated in FIGS. 5A and 5B, the virtual IVI system 34 checks general-purpose applications currently operating on the open platform 32 and references the attribute information of the open PF applications A and B that are confirmed to be operating. The attribute information contains information specifying whether the operation suspension is allowed (certified) or not (uncertified) during the interrupt process. The virtual IVI system 34 determines whether each of the currently-operating open PF applications A and B are certified or uncertified. The example described below assumes that the open PF application A is certified to allow the operation suspension and the open PF application B is uncertified to disallow the operation suspension.

At a given timing, the navigation application 31a notifies the HMI controller 35 of a request as a high-priority interrupt process to display an enlarged view for an intersection as a route guidance target. In response to this, the HMI controller 35 issues a content image drawing instruction to the navigation application 31a.

When receiving the drawing instruction from the HMI controller 35, the navigation application 31a draws an enlarged view for the intersection as a route guidance target in a specified image buffer to display the content image on the display device 26. When completing drawing of the enlarged view for the intersection, the navigation application 31a notifies this situation to the HMI controller 35. The HMI controller 35 receives the drawing completion notification from the navigation application 31a and notifies the virtual IVI system 34 that the interrupt process generates a stop event. The HMI controller 35 updates the displayed image on the display device 26 from the content image supplied by the open PF applications A and B to the enlarged intersection view drawn by the navigation application 31a. According to the above-mentioned procedure, when the interrupt event occurs, the screen of the display device 26 automatically transitions to the enlarged intersection view drawn by the navigation application 31a.

The virtual IVI system 34 is notified of the stop event due to the interrupt process from the HMI controller 35 and allows the open PF application A, which the certified application, to suspend processes. In this case, the virtual IVI system 34 allows all certified applications in operation to suspend processes. Open PF application A receives a suspension instruction from the virtual IVI system 34 to suspend application processes. The virtual IVI system 34 forcibly ends the open PF application B, which is the uncertified application. In this case, the virtual IVI system 34 forcibly ends all uncertified applications in operation. When forcibly ended by the virtual IVI system 34, the open PF application B ends application processes.

Thereafter, the navigation application 31a ends the intersection guidance using the enlarged display. The navigation application 31a then notifies the HMI controller 35 of a request to delete the enlarged intersection view. The HMI controller 35 receives the request to delete the enlarged intersection view and issues a drawing end instruction to the navigation application 31a. The navigation application 31a receives the drawing end instruction from the HMI controller 35, ends drawing of the enlarged intersection view, and deletes the image. When the deletion of the enlarged intersection view is complete, the navigation application 31a notifies this situation to the HMI controller 35.

The HMI controller 35 is notified of the deletion completion from the navigation application 31a and notifies the virtual IVI system 34 that a restart event occurs due to end of the interrupt process. In response, the virtual IVI system 34 is notified of the restart event from the HMI controller 35 and instructs the suspended open PF application A (certified application) to restart processes. In this case, the virtual IVI system 34 instructs all suspended certified applications to restart processes. The open PF application A receives a restart instruction from the virtual IVI system 34 and restarts processes of the suspended applications.

The HMI controller 35 switches over the displayed image on the display device 26 from the enlarged intersection view drawn by the navigation application 31a to the content image supplied by the open PF application A, which is released from the suspension. According to the above-mentioned procedure, when the interrupt event ends, the screen of the display device 26 automatically transitions to the content image supplied by open PF application A.

There has been described the example where the above-mentioned interrupt event switches over display on the display device 26. The same applies to an application that generates audio UI output (audio output device 27). When an interrupt process occurs, the interrupt event switches over applications for audio output or suspends or forcibly ends a switched-over general-purpose application. The interrupt event may request the HMI controller 35 to perform the interrupt process on a dedicated application other than the navigation application 31a. For example, the clearance sonar application 31c may need to warn of approach to an obstacle. In such a case, the interrupt event requests the HMI controller 35 to perform the interrupt process. The HMI controller 35 selects the UI output from the clearance sonar application 31c.

(Technical Effects)

The vehicular navigation apparatus according to the embodiment provides the following technical effects.

The vehicular navigation apparatus includes the open platform 32 to operate general-purpose applications. The vehicular navigation apparatus is thereby capable of UI output (information provision based on audiovisual or tactile effects) using general-purpose applications introduced from the cloud computing. Particularly, the open platform 32 enables the use of various general-purpose applications compliant with the open platform standards as well as dedicated applications compliant with standards specific to the vehicular navigation apparatus 1.

The HMI controller 35 itself need not be aware of on which platform the general-purpose application is operating or aware of its operating state. The HMI controller 35 can select necessary UI output according to specified conditions such as the traveling restriction event and the interrupt event solely based on the attribute information notified from the virtual IVI system 34. The virtual IVI system 34 is provided as software operating on the open platform 32 and thereby enables to share data with general-purpose applications operating on the common platform. This makes it easy to acquire the attribute information of the general-purpose applications and observe their operating state.

The function available in cooperation with the virtual IVI system 34 and the HMI controller 35 enables the following: while the standard set-up of the open platform 32 or the general-purpose application is being maintained without the need to install the set-up unique to the vehicular navigation apparatus in the open platform 32 or the general-purpose application itself, each general-purpose application can execute operations satisfying requirements to exhibit its function on the vehicular navigation apparatus.

The HMI controller 35 according to the embodiment is an example of a control device (control means). The virtual IVI system 34 is an example of a management device (management means). The display device 26 or the audio output device 27 is an example of an output device (output means).

According to the present disclosure, a vehicular navigation apparatus can be provided in various forms. For example, the vehicular navigation apparatus according to one mode can include a platform to operate general-purpose applications externally introduced via information communication. The vehicular navigation apparatus can be configured to operate a platform-independent dedicated application and a platform-dependent general-purpose application independently of each other. The vehicular navigation apparatus can include a control device and a management device.

The control device has a function to selectively switch over UI output on a specified output device between UI output of dedicated application and UI output from a general-purpose application operating on the platform. The management device is provided as an application (software) operating on the platform. The management device acquires the attribute information of the general-purpose application introduced in the vehicular navigation apparatus. The management device notifies the control device of the attribute information of the general-purpose application operating on the platform.

Under a specified condition, the control device determines based on the attribute information notified from the management device whether the general-purpose application operating on the platform and using the output device for the UI output is allowed to use the UI output under the specified condition. The determination result may indicate that the general-purpose application operating on the platform and using the output device for the user interface output is not allowed to use the UI output under the specified condition. In such a case, the control device switches over the UI output on the output device to UI output of the dedicated application or to UI output of another general-purpose application that is operating on the platform and is allowed to use the UI output under the specified condition.

According to the above-mentioned navigation apparatus, the platform for operating general-purpose applications enables the UI output using the general-purpose applications introduced in the vehicular navigation apparatus from the outside. The UI output in this context signifies providing some information for a vehicle occupant as a user using various techniques such as audiovisual or tactile effects.

Especially, the vehicular navigation apparatus may use the open platform designed to use software widely used for various computer systems. The vehicular navigation apparatus can thereby use various general-purpose applications compliant with the open platform standards as well as original-standard dedicated applications developed by software development manufacturers exclusive for the vehicular navigation apparatus. The use of versatile applications enables to share information in a wide range of areas in cooperation with cloud computing on the Internet and intelligent mobile terminals such as smartphones.

The control device can selectively switch over UI output between UI output of dedicated applications for the vehicular navigation apparatus and UI output of general-purpose applications operating on the platform based on the attribute information of the general-purpose applications notified from the management device. According to this configuration, the control device can select necessary UI output according to specified conditions solely based on the attribute information notified from the management device without needing to be aware of on which platform the general-purpose application is operating or aware of its operating state.

The management device has a function to intermediate between general-purpose applications operating on the platform and the control device. The management device is provided as software operating on the platform and thereby enables to share data with general-purpose applications operating on the common platform. This makes it easy to acquire the attribute information of the general-purpose applications and observe operating state.

If general-purpose applications operating on the platform comply with the platform standards, the management device and the control device described above can eliminate the need to provide individual set-ups in consideration of operation requirements for the vehicular navigation apparatus to which the general-purpose applications are introduced.

The above-mentioned vehicular navigation apparatus may be configured as follows. The management device acquires the attribute information of the general-purpose application introduced in the vehicular navigation apparatus and stores the acquired attribute information in a specified storage device provided in the vehicular navigation apparatus. Out of the attribute information recorded in the storage device, the management device notifies the control device of the attribute information of the general-purpose application operating on the platform. According to this configuration, the management device can acquire the attribute information of general-purpose applications introduced in the vehicular navigation apparatus whenever the control device needs the attribute information.

Further, the above-mentioned vehicular navigation apparatus may be configured as follows. The vehicular navigation apparatus acquires a general-purpose application by communicating with the outside. The management device acquires the attribute information of the general-purpose application and stores the acquired attribute information in the storage device. This configuration enables the use of the attribute information of the general-purpose application immediately after the general-purpose application is introduced. As to methods of acquiring the attribute information, one method may acquire data of the attribute information originally contained in the acquired general-purpose application. Another method may acquire the attribute information provided from a general-purpose application supplier along with the general-purpose application acquired by information communication with the outside.

Moreover, the above-mentioned vehicular navigation apparatus may be configured as follows. When the UI output performed on the output device under a specified condition is switched over to UI output of the dedicated application, the control device issues a stop notification to the management device. The stop notification signifies stopping the general-purpose application operating on the platform. In response to receiving the stop notification from the control device, the management device suspends or ends the general-purpose application operating on the platform.

According to this configuration, for example, the management device can stop or end the general-purpose application operating on the platform in response to a request from the control device under the condition that UI output of the dedicated application needs to be displayed at top priority. In this case, the control device instructs the management device to stop or end the general-purpose application without directly issuing a request to the general-purpose application in operation. Therefore, the control device need not keep track of which general-purpose application is operating on the platform.

The following configuration is applicable when the management device stops or ends the general-purpose application operating on the platform in response to the request from the control device. When receiving the stop notification from the control device, the management device determines based on the attribute information corresponding to the general-purpose application operating on the platform whether the general-purpose application is suspendable under the specified condition. The management device suspends operation of the general-purpose application when the management device determines that the general-purpose application is suspendable under the specified condition. The management device ends operation of the general-purpose application when the management device determines that the general-purpose application is not suspendable under the specified condition.

In the above configuration, the attribute information may specify some type of priorities for operations in the vehicular navigation apparatus. For example, a general-purpose application manufacturer (supplier) may certify some general-purpose applications and the certification can be acquired as the attribute information. When receiving the stop notification from the control device, the management device suspends a certified general-purpose application or forcibly ends an uncertified general-purpose application. The management device can control general-purpose applications according to their priorities.

The specified condition may be used to switch over the applications performing the UI output as follows. While the vehicle is traveling, for example, the vehicular navigation apparatus gives priority to the UI output of the dedicated application to provide information about the driving support such as an application to provide information useful for a driver who drives the vehicle. The UI output not so useful for vehicle traveling may be switched over to another UI output. This is because the vehicular navigation apparatus, in principle, most importantly needs to provide information about vehicle traveling such as the driving support and a general-purpose application with a high aspect of entertainment is only of secondary importance.

Under condition that the vehicle starts traveling, the control device may determine based on the attribute information whether the general-purpose application operating on the platform and using the output device for the UI output is allowed to use UI output during the vehicle traveling. When determining that the general-purpose application is not allowed to use the UI output during the vehicle traveling, the control device may switch over the UI output on the output device to UI output of the dedicated application or to UI output of another general-purpose application that is operating on the platform and is allowed to use the UI output during the vehicle traveling.

In the above configuration, the attribute information may specify the availability of UI output during vehicle traveling in the vehicular navigation apparatus. For example, a general-purpose application manufacturer may certify some general-purpose applications and the certification can be acquired as the attribute information. When the vehicle starts traveling, an uncertified general-purpose application is switched over to a dedicated application or another certified general-purpose application for UI output. Control can be provided according to the availability of UI output during the vehicle traveling.

As the specified condition to switch over applications for UI output, a dedicated application in the vehicular navigation apparatus may cause an accidental and top-priority event such as guidance, warning, or alarm immediately before an intersection. In such a case, the vehicular navigation apparatus may provide control to interrupt other UI outputs and perform UI output related to the top-priority event.

The control device receives a UI output interrupt request from the dedicated application. When accepting the interrupt request, the control device switches over the UI output on the output device to the UI output of the dedicated application. In addition, the control device notifies the management device of a stop notification that instructs the general-purpose application operating on the platform to stop. The management device may respond to the stop notification received from the control device and suspend or end the general-purpose application operating on the platform.

In this manner, the vehicular navigation apparatus where general-purpose applications are introduced can reliably perform the UI output of the dedicated application generating an accidental and top-priority event. Therefore, the vehicular navigation apparatus can provide its original functions.

While there have been described the embodiments, configurations, and modes of the present disclosure, the present disclosure is not limited to the above-mentioned embodiments, configurations, and modes. For example, the scope of the embodiments, configurations, and modes concerning the disclosure also includes embodiments, configurations, and modes that may result from an appropriate combination of technical portions disclosed in different embodiments, configurations, and modes.

The invention claimed is:
1. A vehicular navigation apparatus having a platform for operating a general-purpose application externally introduced via information communication, the vehicular navigation apparatus being configured to operate a dedicated application independent of the platform and the general-purpose application on the platform independently of each other, the vehicular navigation apparatus comprising:
   a control device that switches over user interface output on a specified output device selectively among user interface output of the dedicated application and user inter- face output of the general-purpose application that is operating on the platform; and a management device that is provided as application software operating on the platform, acquires attribute information of the general-purpose application introduced in the vehicular navigation apparatus, and notifies the control device of the attribute information of the general-purpose application operating on the platform, wherein:

under a specified condition, the control device determines based on the attribute information notified from the management device whether the general-purpose application operating on the platform and using the output device for the user interface output is allowed to use the user interface output under the specified condition; and when the control device determines that the general-purpose application operating on the platform and using the output device for the user interface output is not allowed to use the user interface output under the specified condition, the control device switches over the user interfaceuser interface output on the output device to one of the user interface output of the dedicated application and the user interface output of another general-purpose application that is operating on the platform and that is allowed to use the user interface output under the specified condition.

2. The vehicular navigation apparatus according to claim 1, wherein:

the management device acquires the attribute information of the general-purpose applications introduced in the vehicular navigation apparatus, stores the acquired attribute information in a specified storage device provided in the vehicular navigation apparatus, and notifies the control device of the attribute information of the general-purpose application operating on the platform out of the attribute informations stored in the storage device.

3. The vehicular navigation apparatus according to claim 2, wherein:

when the vehicular navigation apparatus acquires a general-purpose application by communicating with outside, the management device acquires the attribute information of the general-purpose application and stores the acquired attribute information in the storage device.

4. The vehicular navigation apparatus according to claim 1, wherein:

when the user interface output on the output device under the specified condition is switched over to the user interface output of the dedicated application, the control device notifies the management device of a stop notification to stop the general-purpose application operating on the platform; and in response to receipt of the stop notification from the control device, the management device suspends or ends the general-purpose application operating on the platform.

5. The vehicular navigation apparatus according to claim 4, wherein:

when the management device receives the stop notification from the control device, the management device determines, based on the attribute information corresponding to the general-purpose application operating on the platform, whether the general-purpose application is suspendable under the specified condition;

the management device suspends operation of the general-purpose application when the management device determines that the general-purpose application is suspendable under the specified condition; and the management device ends operation of the general-purpose application when the management device determines that the general-purpose application is not suspendable under the specified condition.

6. The vehicular navigation apparatus according to claim 1, wherein:

under condition that the vehicle starts traveling, the control device determines based on the attribute information whether the general-purpose application operating on the platform and using the output device for the user interface output is allowed to use the user interface output during the vehicle traveling; and when the control device determines that the general-purpose application is not allowed to use the user interface output during the vehicle traveling, the control device switches over the user interface output on the output device to one of the user interface output from the dedicated application and the user interface output from another general-purpose application that is operating on the platform and is allowed to use the user interface output during vehicle traveling.

7. The vehicular navigation apparatus according to claim 1, wherein:

the control device receives from the dedicated application an interrupt request, which requests to interrupt the user interface output;

when the control device accepts the interrupt request, the control device switches over the user interface output on the output device to the user interface output of the dedicated application and notifies the management device of a stop notification that instructs the general-purpose application operating on the platform to stop; and in response to receipt of the stop notification from the control device, the management device suspends or ends the general-purpose application operating on the platform.

* * * * *